(12) United States Patent
Yamashita et al.

(10) Patent No.: US 12,553,513 B2
(45) Date of Patent: Feb. 17, 2026

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,955

(22) PCT Filed: Mar. 23, 2023

(86) PCT No.: PCT/JP2023/011613
§ 371 (c)(1),
(2) Date: Sep. 13, 2024

(87) PCT Pub. No.: WO2023/182450
PCT Pub. Date: Sep. 28, 2023

(65) Prior Publication Data
US 2025/0198500 A1 Jun. 19, 2025

(30) Foreign Application Priority Data
Mar. 23, 2022 (JP) .................. 2022-047610

(51) Int. Cl.
*F16H 57/04* (2010.01)
*F16H 47/06* (2006.01)
(Continued)

(52) U.S. Cl.
CPC ....... *F16H 57/0424* (2013.01); *F16H 57/031* (2013.01); *F16H 57/035* (2013.01);
(Continued)

(58) Field of Classification Search
CPC ............. F16H 57/0424; F16H 57/0435; F16H 57/045; F16H 57/0404; F16H 57/031;
(Continued)

(56) References Cited

U.S. PATENT DOCUMENTS 3,800,914 A * 4/1974 Miyata ...................... B03C 1/28
184/6.25
4,666,594 A * 5/1987 Schneider .............. B01D 19/02
96/204
(Continued)

FOREIGN PATENT DOCUMENTS

JP 2001-107715 A 4/2001
JP 2005-083491 A 3/2005
(Continued)

*Primary Examiner* — Henry Y Liu
(74) *Attorney, Agent, or Firm* — Spencer Fane LLP

(57) ABSTRACT

A power transmission device includes a housing that accommodates a power transmission mechanism, a partition section that is provided in the housing and that supports the power transmission mechanism, a first oil path that is provided inside the partition section, a second oil path that is provided inside the partition section, a recess that is provided in the partition section, and a filter member that is disposed inside the recess. The recess is provided with an opening facing a direction of an axis of rotation of the power transmission device. The first oil path and the second oil path communicate via the recess.

14 Claims, 10 Drawing Sheets

(51) Int. Cl.
   *F16H 47/08*    (2006.01)
   *F16H 57/02*    (2012.01)
   *F16H 57/031*   (2012.01)
   *F16H 57/035*   (2012.01)
   *F16H 63/34*    (2006.01)

(52) U.S. Cl.
   CPC ..... *F16H 57/0404* (2013.01); *F16H 57/0435* (2013.01); *F16H 57/045* (2013.01); *F16H 63/3416* (2013.01); *F16H 47/065* (2013.01); *F16H 47/08* (2013.01); *F16H 2057/02008* (2013.01); *F16H 2057/02043* (2013.01)

(58) Field of Classification Search
   CPC ............... F16H 57/035; F16H 57/0441; F16H 57/0423; F16H 57/0489; F16H 57/0453; F16H 57/0439; F16H 2057/02008; F16H 2057/02043; F16H 63/3416; F16H 61/0031; F16H 47/065; F16H 47/08; F16H 37/022
   USPC .......................................................... 474/43
   See application file for complete search history.

(56) References Cited

U.S. PATENT DOCUMENTS

| | | | | |
|---|---|---|---|---|
| 4,889,621 A * | 12/1989 | Yamada | ............. | B01D 35/0273 210/450 |
| 4,903,798 A * | 2/1990 | Takemoto | ........... | F16H 57/0421 184/6.12 |
| 5,050,447 A * | 9/1991 | Hayakawa | .............. | F16H 61/00 74/606 R |
| 5,091,078 A * | 2/1992 | Ogawa | ...................... | F16N 7/40 74/606 R |
| 5,099,954 A * | 3/1992 | Kikuchi | .................. | F16N 39/06 210/485 |
| 5,435,334 A * | 7/1995 | Inukai | ................. | F16H 61/0021 137/545 |
| 6,165,088 A * | 12/2000 | Tsubata | ............... | F16H 57/0489 474/45 |
| 6,189,412 B1 * | 2/2001 | Tsubata | ............... | F16H 61/0009 74/606 R |
| 6,238,312 B1 * | 5/2001 | Tsubata | ............... | F16H 57/0489 474/146 |
| 6,929,097 B2 * | 8/2005 | Hedman | ............. | F16H 57/0494 184/26 |
| 7,096,753 B2 * | 8/2006 | Kawakubo | ........... | F16H 57/023 180/344 |
| 8,069,951 B2 * | 12/2011 | Sugano | ............... | F16H 57/0489 184/6.21 |
| 8,590,424 B2 * | 11/2013 | Nonomura | .......... | F16H 57/0402 184/6.12 |
| 10,167,753 B2 * | 1/2019 | Mukohara | ................ | F01M 1/02 |
| 10,400,834 B2 * | 9/2019 | Sugiura | ............ | F16H 57/0484 |
| 10,451,170 B2 * | 10/2019 | Arnelöf | ............ | F16H 57/0447 |
| 10,473,005 B2 * | 11/2019 | Mori | .................... | F16H 57/0435 |
| 10,738,666 B2 * | 8/2020 | Okazawa | .............. | F04C 2/102 |
| 11,226,032 B2 * | 1/2022 | Tanaka | ............... | F16H 57/0441 |
| 11,447,001 B2 * | 9/2022 | Nishiyabu | .............. | B60K 6/387 |
| 2005/0011705 A1 * | 1/2005 | Hedman | ............. | F16H 57/0494 184/26 |
| 2005/0081664 A1 * | 4/2005 | Kawakubo | ........... | F16H 57/023 74/337.5 |
| 2006/0068963 A1 * | 3/2006 | Sugano | ............... | F16H 61/0025 475/206 |
| 2006/0070811 A1 * | 4/2006 | Sugano | ............... | F16H 57/0489 184/6.21 |
| 2007/0272196 A1 * | 11/2007 | Nishi | .................... | F16H 57/043 123/197.1 |
| 2009/0107769 A1 * | 4/2009 | Sato | ....................... | B60K 6/365 184/106 |
| 2011/0011205 A1 * | 1/2011 | Nonomura | .......... | F16H 57/0402 74/606 R |
| 2016/0369853 A1 * | 12/2016 | Sugiura | .................... | F01M 1/10 |
| 2017/0276036 A1 * | 9/2017 | Mukohara | ........... | F16H 57/0432 |
| 2017/0299047 A1 * | 10/2017 | Warnecke | ........... | F16H 57/0441 |
| 2018/0087655 A1 * | 3/2018 | Arnelöf | ............ | F16H 57/0441 |
| 2018/0223706 A1 * | 8/2018 | Mori | ........................ | F01M 1/02 |
| 2019/0101207 A1 * | 4/2019 | Tanka | ....................... | F04C 2/10 |
| 2019/0285165 A1 * | 9/2019 | Hashimoto | ........... | B60W 20/10 |
| 2020/0131956 A1 * | 4/2020 | Okazawa | ................ | F16H 57/01 |
| 2021/0001706 A1 * | 1/2021 | Nishiyabu | ................ | B62M 7/02 |
| 2021/0190201 A1 * | 6/2021 | Shimokobe | .................. | H02K 9/19 |
| 2021/0356035 A1 * | 11/2021 | Meid | ................... | F16H 61/0267 |
| 2022/0196135 A1 * | 6/2022 | Tamura | ............... | F16H 57/0457 |

FOREIGN PATENT DOCUMENTS

| | | |
|---|---|---|
| JP | 2007-315518 A | 12/2007 |
| JP | 2011-021666 A | 2/2011 |

* cited by examiner

POWER TRANSMISSION DEVICE

CROSS-REFERENCE TO RELATED APPLICATIONS

This application is a U.S. national stage application of International Application No. PCT/JP2023/011613, filed on Mar. 23, 2023. This application also claims priority to Japanese Patent Application No 2022-047610, filed on Mar. 23, 2022.

BACKGROUND

Technical Field

The present invention relates to a power transmission device.

Background Information

Japanese Patent Laid-Open Publication No. 2005-083491 discloses a power transmission device equipped with an internal catch tank.

SUMMARY

In this power transmission device, a power transmission mechanism is housed in a housing. In addition to the rotating elements that constitute the power transmission mechanism, a catch tank for storing oil scooped up by the rotating elements is provided in the housing. A plurality of oil guiding passages for supplying oil to various parts of the power transmission device are connected to the catch tank.

Japanese Patent Laid-Open Publication No. 2005-083491 suggests placing a filter in each of the oil guiding passages to remove foreign matter contained in the oil. However, there is no mention of how the oil guiding passages are to be laid out nor of the arrangement of the filters.

Simply adding filters to the power transmission device can increase its size.

Therefore, there is a need to be able to arrange the filters without increasing the size of the power transmission device.

One aspect of the present disclosure includes a housing that accommodates a power transmission mechanism, a partition section provided within the housing that supports the power transmission mechanism, a first oil path provided within the partition section, a second oil path provided within the partition section, a recess provided in the partition section, and a filter member positioned in the recess, wherein the recess is provided with an opening facing the direction of the axis of rotation of the power transmission mechanism, and the first oil path and the second oil path are in communication through the recess, constituting the power transmission device.

According to one aspect of the present disclosure, filters can be arranged without increasing the size of the power transmission device.

BRIEF DESCRIPTION OF THE DRAWINGS

Referring now to the attached drawings which form a part of this original disclosure.

DETAILED DESCRIPTION

Figure 1:
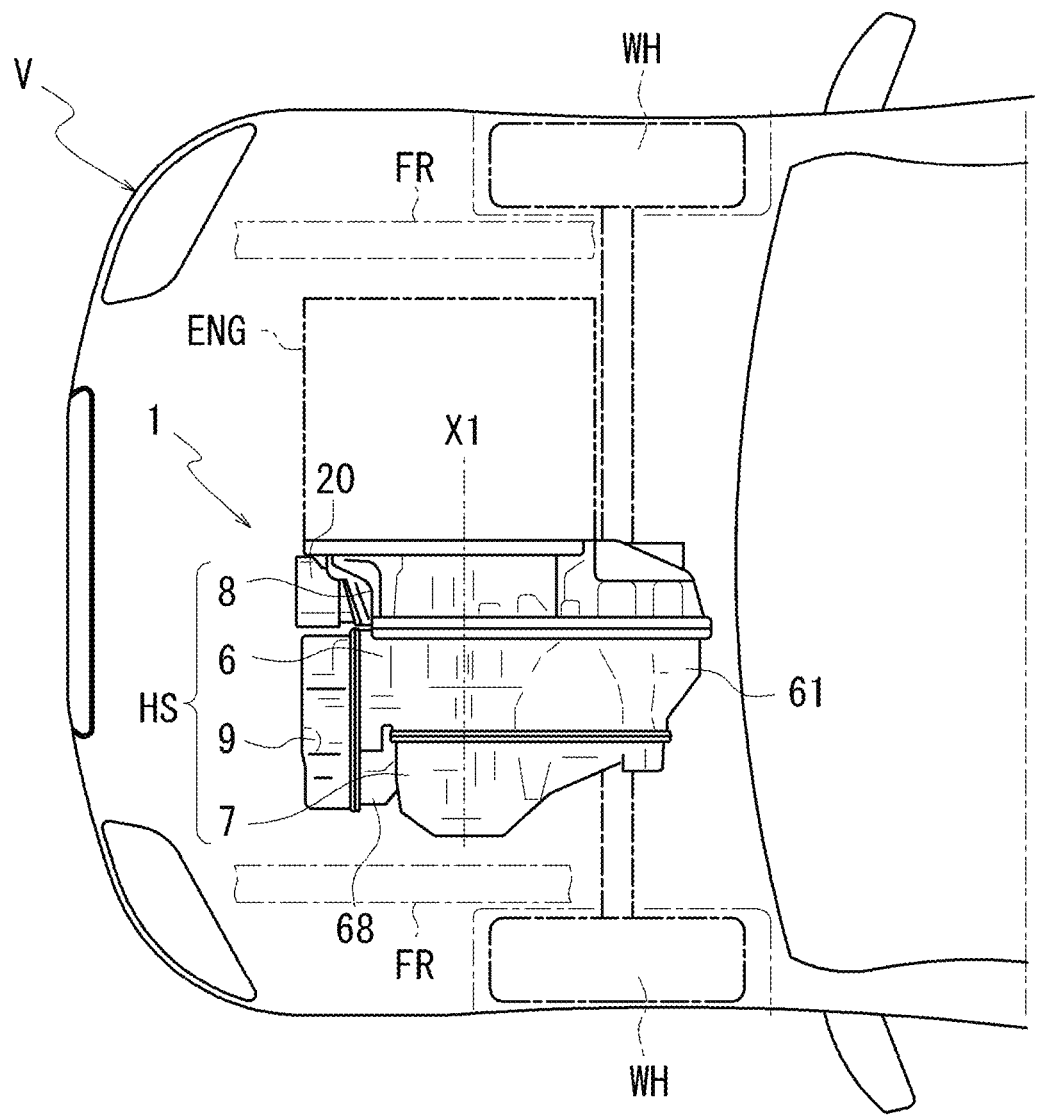
FIG. 1 is a schematic diagram illustrating the arrangement of a power transmission device in a vehicle.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine). Note that if the power transmission device is a device for transmitting the output rotation of a motor, the term "control unit" in this specification means an inverter.

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap as viewed in the prescribed direction.

"Not overlapping as viewed in a prescribed direction" and "offset as viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap as viewed in the prescribed direction.

"As viewed from a prescribed direction, a first element (part, section, etc.) is located between a second element (part, section, etc.) and a third element (part, section, etc.)" means that as viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element as viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in single file in the direction of the vertical line VL.

For example, if the plurality of valve bodies are stacked to form the control valve, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same An embodiment of the present disclosure is described below.

FIG. 1 is a schematic diagram illustrating the arrangement of a power transmission device 1 in a vehicle V.

Figure 2:
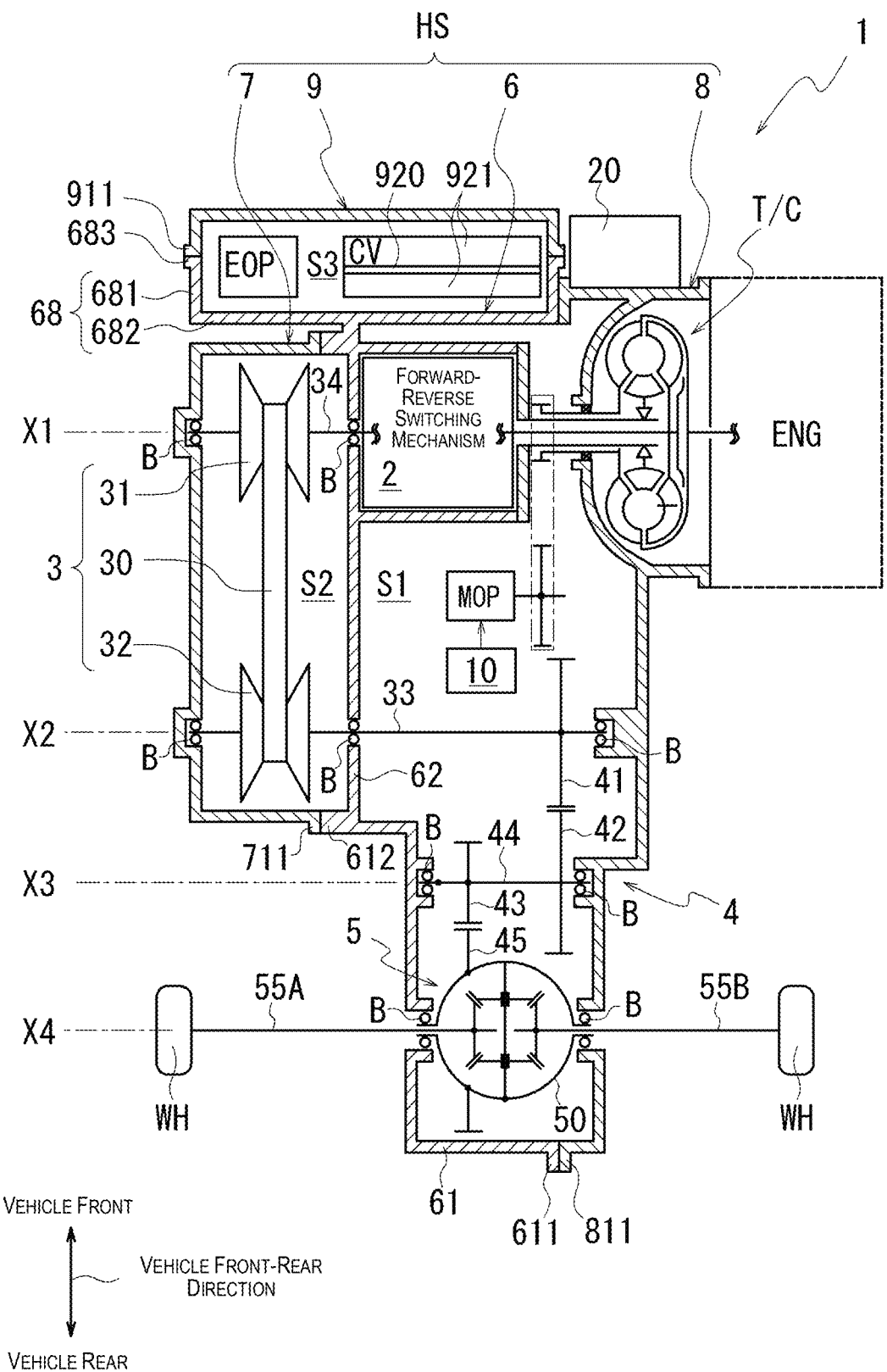
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear meshes with the output gear 41 in a manner allowing transmission of rotation. The idler gear 42 is spline-fitted to an idler shaft 44 and rotates in together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3 (third axis).

The final gear 45 and the drive shafts 55A, 55B are arranged coaxially on a common axis of rotation X4 (fourth axis). In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
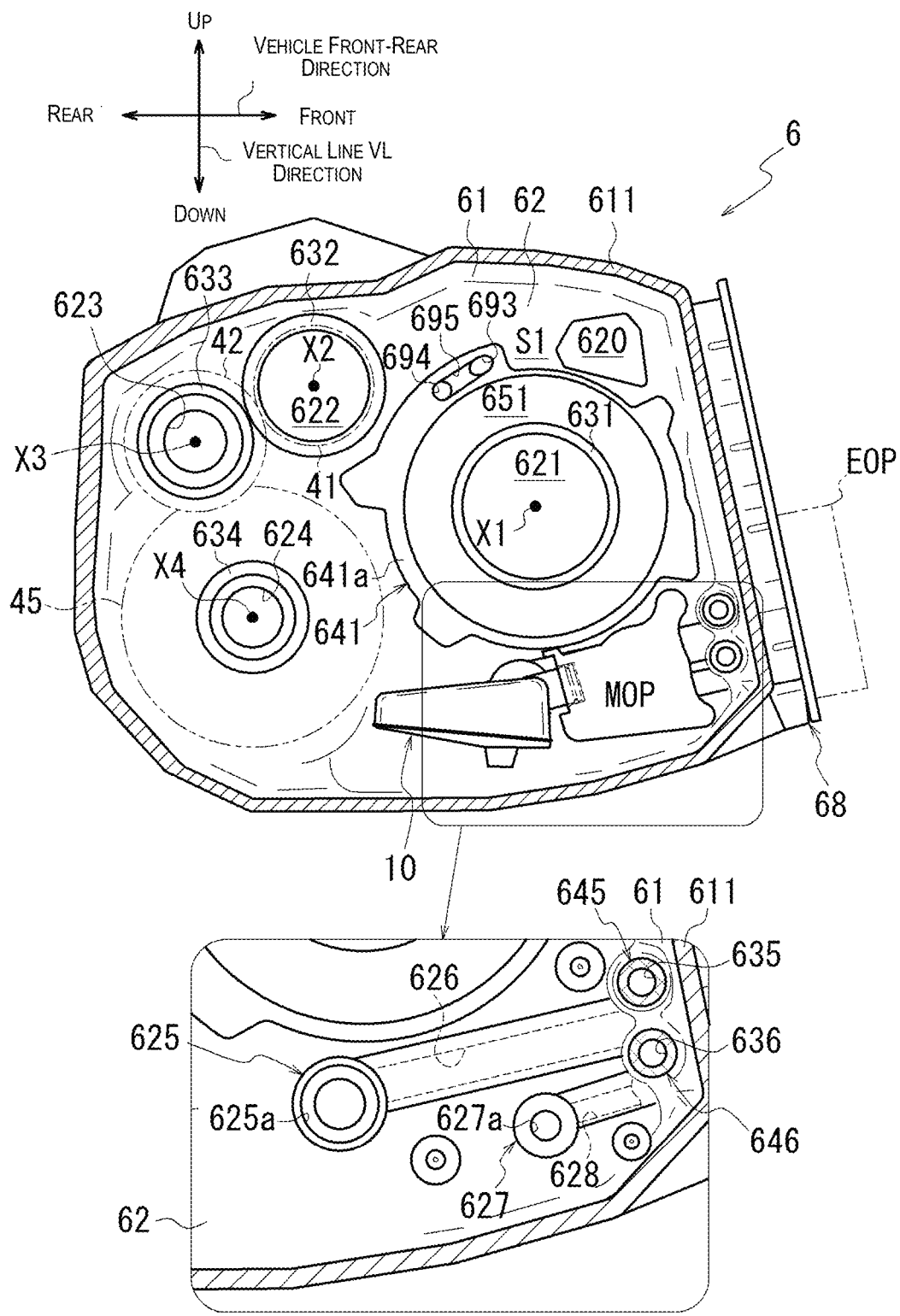
FIG. 3 is a view of a case from the second cover side.

FIG. 3 is a plan view of the case 6 as viewed from the second cover 8 side.

Note that in the enlarged view in FIG. 3, a strainer 10 and the mechanical oil pump MOP are omitted, showing the areas around the connection sections 625, 627 provided in the partition section 62.

As shown in FIG. 3, the case 6 has a cylindrical circumferential wall section 61 and the partition section 62. The partition section 62 cuts across the axes of rotation (axes of rotation X1 to X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a second chamber S2.

The first chamber S1 accommodates the forward-reverse switching mechanism 2, the reduction mechanism 4, and the differential mechanism 5. The second chamber S2 accommodates the variator 3.

In the case 6, an opening in the first chamber S1 side is sealed by the second cover 8 (torque converter cover). The second chamber S2 side opening is sealed by the first cover 7 (side cover).

In the case 6, oil used for the operation of the power transmission device 1 or lubrication of the component elements of the power transmission device 1 is collected below the space between the first cover 7 and the second cover 8 (the first chamber S1 and the second chamber S2).

As shown in FIG. 3, the end surface of the case 6 on the second cover 8 side (toward the viewer) is a joining section 611 with the second cover 8. The joining section 611 is a flanged section that surrounds the entire circumference of the opening on the second cover 8 side of the partition section 62. The joining section 811 is joined to the entire circumference of the joining section 611 on the second cover 8 side (see FIG. 2). The case 6 and the second cover 8 are connected by bolts, not shown, to join the joining sections 611 and 811 together.

The opening of the case 6 is thus held in a state sealed by the second cover 8, forming the closed first chamber S1.

As shown in FIG. 3, in the case 6, the partition section 62 is located inside the joining section 611.

The partition section 62 of the case 6 is provided in a direction essentially orthogonal to the axes of rotation (axes of rotation X1-X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2).

The region 651 between the support wall section 631 and the circumferential wall section 641 is a cylindrical space that accommodates a piston (not shown) of the forward-reverse switching mechanism 2, friction plates (forward clutch, reverse brake), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided on the surface of the partition section 62 facing the first chamber S1 (toward the viewer). The support wall section 632 projects toward the viewer in FIG. 3 (toward the second cover 8 side in FIG. 2).

An output shaft 33 (see FIG. 2) of the secondary pulley 32 is rotatably supported on the inner circumference of the support wall section 632 via the bearings B.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle as viewed from the axis of rotation X1, and diagonally below toward the rear of the vehicle as viewed from the axis of rotation X2.

On surface of the partition section 62 on the first chamber S1 (toward the viewer), a cylindrical support wall section 633 that surrounds the support hole 623 is provided. In FIG. 3, the support wall section 633 protrudes toward the viewer (the side of the second cover 8 in FIG. 2). The support wall section 633 surrounds the outer circumference of the support hole 623 with a gap therebetween. The inner circumference of the support wall section 633 supports the idler shaft 44 of the reduction mechanism 4 (see FIG. 2) rotatably via the bearings B.

As shown in FIG. 3, the through-hole 624 is formed around the axis of rotation X4.

In the power transmission device 1 mounted in the vehicle V, the axis of rotation X4 is positioned diagonally below toward the rear of the vehicle as viewed from the axis of rotation X1, diagonally below toward the rear of the vehicle as viewed from the axis of rotation X2, and diagonally below toward the front of the vehicle as viewed from the axis of rotation X3.

On the surface of the partition section 62 on the first chamber S1 side (toward the viewer), a cylindrical support wall section 634 that surrounds the through-hole 624 is provided. In FIG. 3, the support wall section 634 protrudes toward the viewer (the second cover 8 side in FIG. 2). The support wall section 634 surrounds the outer circumference of the through-hole 624 with a gap therebetween. The inner circumference of the support wall section 634 rotatably supports the differential case 50 of the differential device 5 (see FIG. 2) via the bearings B.

As shown in FIG. 2, the final gear 45, in the form of a ring as viewed from the direction of the axis of rotation X4, is fixed to the outer circumference of a differential case 50. The final gear 45 rotates about the axis of rotation X4 together with the differential case 50.

In the case 6 shown in FIG. 3, in a region below the arcuate circumferential wall section 641 and farther toward the front of the vehicle than the final gear 45, the strainer 10 is provided.

In the partition section 62, as shown in FIG. 3, the connecting section 625 with the strainer 10 and the connecting section 627 with the mechanical oil pump MOP are provided below the circumferential wall section 641.

A connection port 625a of the connection section 625 and a connection port 627a of the connecting section 627 open in the same direction. The connection port 625a of the connecting section 625 communicates with an oil path 626 provided in the partition section 62. The connection port 627a of the connecting section 627 communicates with an oil path 628 provided in the partition section 62.

The oil paths 626, 628 extend in straight lines toward the housing section 68 (to the right in the diagram) inside the partition section 62. The oil path 628 connects to the control valve CV (see FIG. 2) housed in the housing section 68 via the oil paths inside the case 6.

As shown in FIG. 3, in the lower part of the partition section 62 toward the front of the vehicle, bosses 645 and 646 are provided near the region where the oil path 626 described above intersects the circumferential wall section 61.

The bosses 645 and 646 are cylindrical members that surround a first oil path 635 and the second oil path 636, respectively.

The bosses 645 and 646 project toward the viewer (toward the second cover 8 side). The bosses 645 and 646 are arranged vertically aligned near the circumferential wall section 61. The boss 645 is positioned above the boss 64 in the direction of the vertical line VL. The housing section 68 for the control valve CV is located on the opposite side of the boss sections 645 and 646 as viewed from the circumferential wall section 61 (to the right in the diagram).

The first oil path 635 within the boss 645 and the second oil path 636 within the boss 646 are each connected to the control valve CV.

The first oil path 635 and the second oil path 636 are provided with openings facing the viewer (toward the second cover 8 side).

An opening 620 is provided at the top the circumferential wall section 641 in the partition section 62. The opening 620 is provided near the circumferential wall section 61 on the front side of the vehicle. The opening 620 penetrates the partition section 62 in the thickness direction, connecting the first chamber S1 and the second chamber S2 within the case 6.

Figure 4:
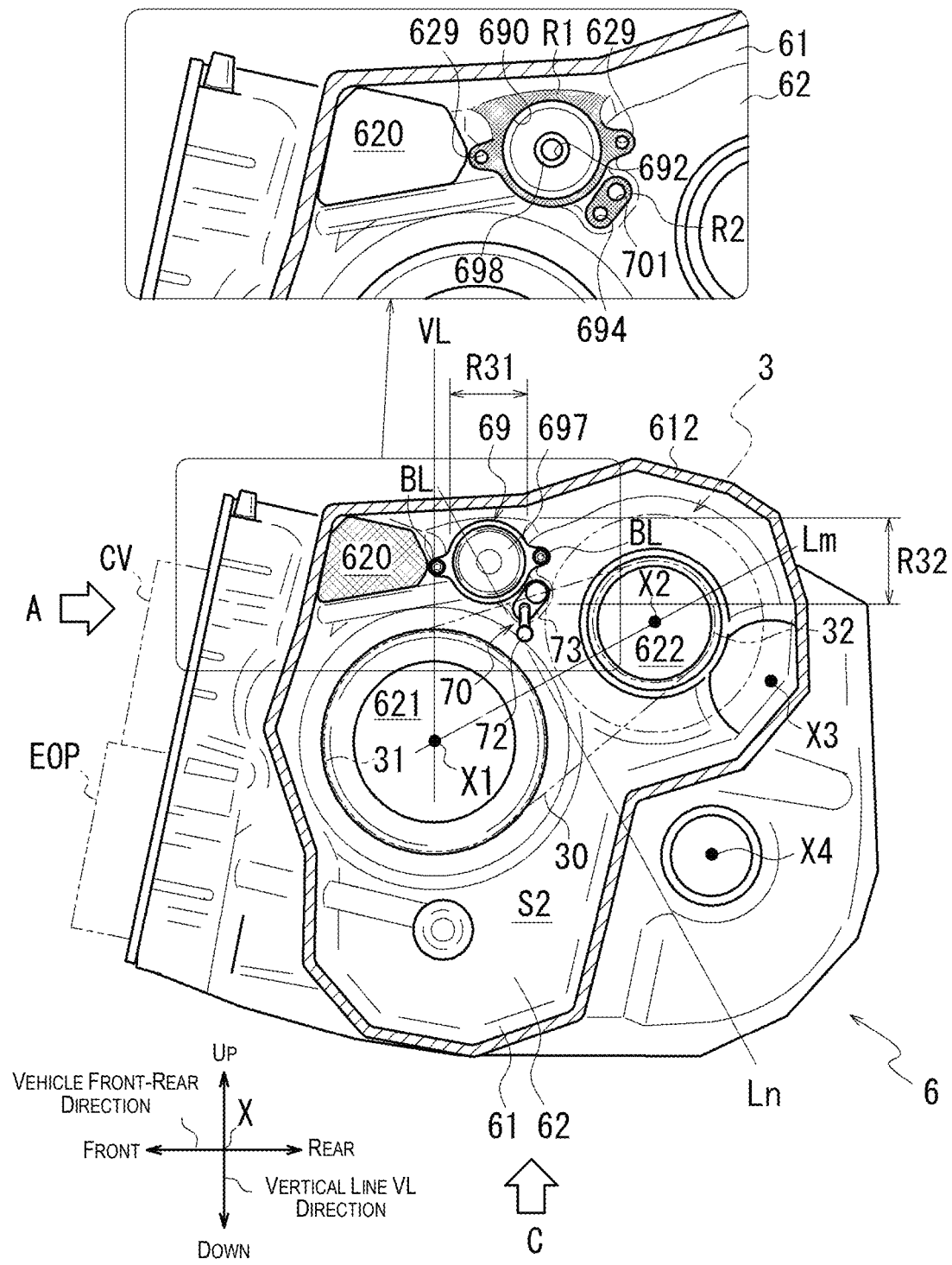
FIG. 4 is a view of the case from the first cover side.

FIG. 4 is a plan view of the case 6 as viewed from the first cover 7 side. Note that in FIG. 4, the area of the opening 620 is shown with crosshatching. The enlarged view in FIG. 4 shows a state with an oil filter 69 and an injection member 70 removed. In the enlarged view of FIG. 4, mounting regions R1 and R2 behind the oil filter 69 and the injection member 70 are shown with crosshatching.

As shown in FIG. 4, on the surface of the case 6 on the first cover 7 side, the opening 620 and through-holes 621, 622 open into the inside of the circumferential wall section 61 that surrounds the second chamber S2.

On the end surface of the circumferential wall section 61 facing the first cover 7, a joining section 612 with the first cover 7 is provided. The joining section 612 is a flanged section that surrounds the entire circumference of the opening on the first cover 7 side of the partition section 62. The partition section 62 is located inside the joining section 612.

The joining section 612 is joined by the entire circumference to the joining section 711 on the first cover 7 side (see FIG. 2). The case 6 and the first cover 7 are connected by bolts, not shown, to join the joining sections 612, 711 together. Thus, the opening of the case 6 is sealed by the first cover 7, forming the closed second chamber S2.

The opening 620 is provided along the upper edge of the circumferential wall section 61 near the circumferential wall section 61 toward the front side of the vehicle.

An oil filter 69 is provided toward the rear side of the vehicle, as viewed from the opening 620.

The oil filter 69 is positioned adjacent to the opening 620.

In the partition section 62, a through-hole 621 is located below the opening 620 and the oil filter 69. A through-hole 622 is positioned diagonally above the rear side of the vehicle, as viewed from the through-hole 621.

The opening 620 is located on the front side of the vehicle along the vertical line VL passing through the center of the through-hole 621 (axis of rotation X1). The oil filter 69 and the through-hole 622 are positioned on the vehicle rear side of the vertical line VL.

As viewed from the direction of the axis of rotation X1, the oil filter 69 is positioned between the center of the through-hole 621 (axis of rotation X1) and the center of the through-hole 622 (axis of rotation X2). In the vehicle front-rear direction, the oil filter 69 is disposed in a location toward the axis of rotation X1. The oil filter 69 is provided in a location above a line Lm connecting the axis of rotation X1 and the axis of rotation X2 where a line Ln intersects the line Lm at a right angle. The line Ln intersects the line Lm at a right angle at a position on the line Lm midway between the axis of rotation X1 and the axis of rotation X2.

An injection member 70 for lubricating oil OL is provided on the vehicle rear side of the oil filter 69. The injection member 70 is located below the oil filter 69 and on the vehicle rear side.

As shown in the enlarged view of FIG. 4, in the partition section 62, a mounting region R1 for the oil filter 69 is provided near the circumferential wall section 61. The mounting region R1 is a flat surface orthogonal to the axis of rotation X1, and a recess 690 is provided in this mounting region R1.

The recess 690 is provided using the thickness of the partition section 62 and is recessed away from the viewer. The recess 690 opens into the second chamber S2 (toward the viewer). The opening of the recess 690 faces the direction of the axis of rotation X of the power transmission device 1 (the axis of rotation X1 of the primary pulley 31 and the axis of rotation X2 of the secondary pulley 32).

Bolt holes 629, 629 for bolts BL are provided on both sides of the recess 690. When the opening of the recess 690 is sealed with a cover 697, bolts BL, BL that pass through the cover 697 are screwed into the bolt holes 629.

The mounting region R2 for the injection member 70 is located diagonally below the mounting region R1 and spaced apart from the mounting region R1. The mounting region R2 projects toward the viewer (the second chamber S2 side). The mounting region R2 is a flat surface orthogonal to the axis of rotation X1 and has an oil path 694 and a bolt hole 701 open therein. The bolt hole 701 is used to screw in a mounting plate 73 of the injection member 70. In this state, the injection part 72 of the injection member 70 is positioned toward the line Lm, away from the belt 30 wrapped around the primary pulley 31 and the secondary pulley 32, to avoid interference with the belt 30.

As shown in FIG. 2, on the side facing the front of the vehicle, the case 6 is provided with a housing section 68.

The housing section 68 is provided with the opening facing the front of the vehicle. The housing section 68 is arranged in the direction along the axis of rotation X1. As viewed from the radial direction of the axis of rotation X1, the housing section 68 is formed having a range in the direction of the axis of rotation X1 from the region of the circumferential wall section 61 of the case 6 to the side of the first cover 7.

As shown in FIG. 2, a region of approximately half of the bottom wall section 682 of the housing section 68 on the engine ENG side is integrated with the circumferential wall section 61. The region of the other approximately half of the bottom wall section 682 is provided with a gap on the outer circumference of the first cover 7, extending from the circumferential wall section 61.

Figure 5:
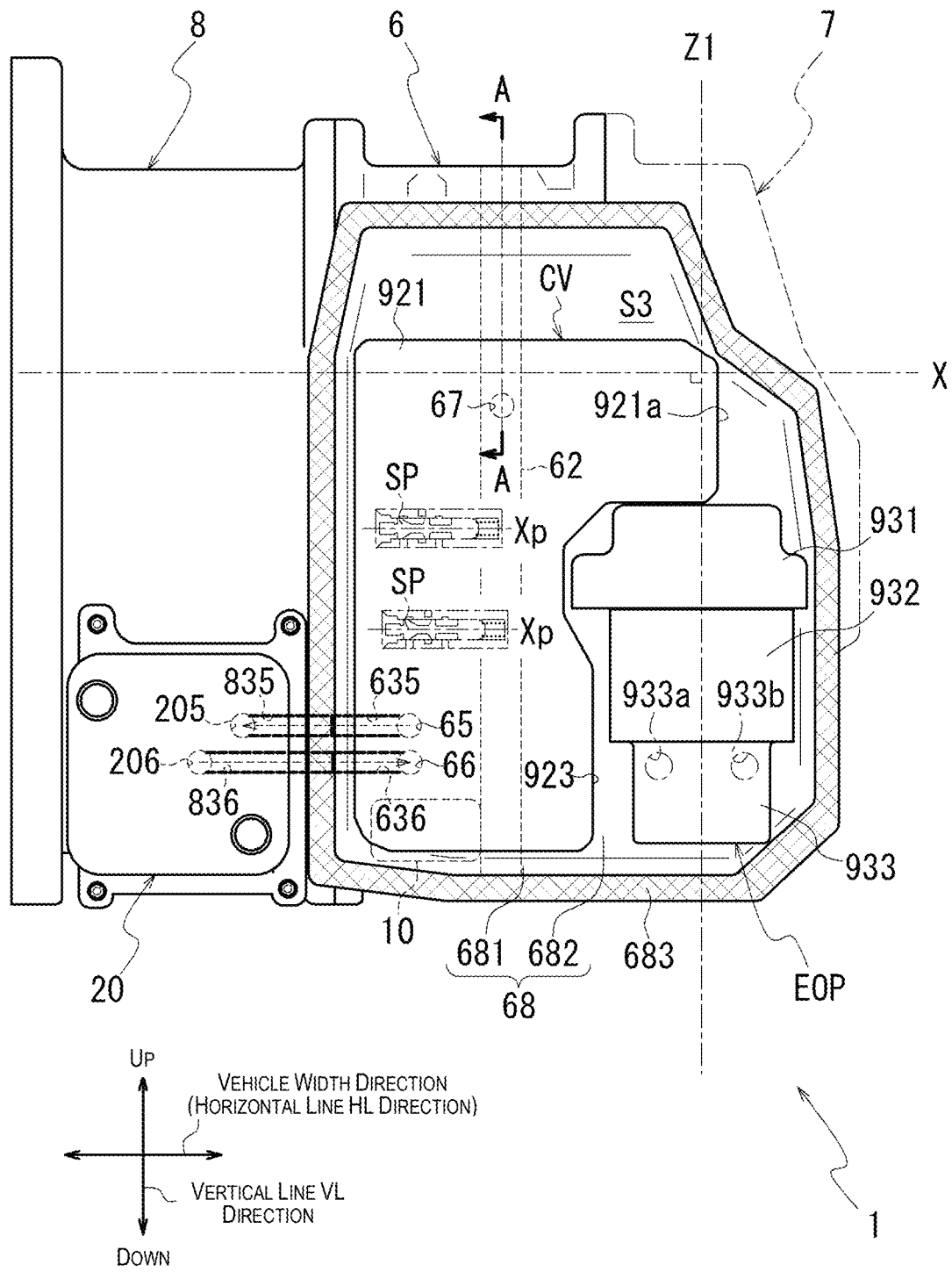
FIG. 5 is a view of the housing chamber from the front of the vehicle.

As shown in FIG. 5, as viewed from the front of the vehicle, the housing section 68 has a surrounding wall 681 that encircles the entire outer circumference of the bottom wall section 682. The end surface of the surrounding wall 681 toward the viewer serves as the joining section 683 with the front cover 9. The joining section 683 is a flanged section that surrounds the entire opening on the front cover 9 side of the surrounding wall 681.

As shown in FIG. 2, the joining section 683 is joined around the entire circumference with the joining section 911 on the third cover 9 side. The housing section 68 and the third cover 9 are connected by bolts, not shown, with the joining sections 683, 911 joined together. This maintains the opening of the housing section 68 in a state sealed by the third cover 9, forming the closed housing chamber S3.

The housing chamber S3 accommodates the control valve CV and the electric oil pump EOP.

As shown in FIG. 2, the control valve CV has a basic configuration in which a separation plate 920 is sandwiched between valve bodies 921, 921. Inside the control valve CV, an oil pressure control circuit 95 (see FIG. 6) is formed. The oil pressure control circuit 95 is provided with pressure regulating valves (spool valves) that operate based on a solenoid driven by commands from a control device (not shown) and the signal pressure generated by the solenoid.

As shown in FIG. 5, in the housing chamber S3, the control valve CV is upright, so that the direction of stacking of the valve bodies 921, 921 is aligned in the front-rear direction of the vehicle (toward and away from the viewer).

In the housing chamber S3, the control valve CV is upright so as to satisfy the following conditions. (a) A plurality of pressure regulating valves SP (spool valves) inside the control valve CV are aligned in the vertical line VL direction (vertical direction) based on the state of installation of the power transmission device 1 in vehicle V, and (b) a direction of advancement and retraction Xp of the pressure regulating valves SP (spool valves) is along the horizontal line direction.

Consequently, the direction of advancement and retraction of the spool valves inside the control valve is oriented along the horizontal line direction. Additionally, the spool valves inside the control valve are offset in the vertical line VL direction. Thus, the housing chamber S3 is prevented from increasing in size in the vehicle front-rear direction, while ensuring that the movement of the spool valves is not hindered.

As shown in FIG. 5, the control valve CV, as viewed from the front of the vehicle, forms an approximate L-shape provided with a cut-out 923 in the essentially rectangular valve body 921. The cut-out 923 in the housing chamber S3 is located at the lower part of the region overlapping the first cover 7, as viewed from the front of the vehicle.

As viewed from the front of the vehicle, the cut-out 923 is shown to house the electric oil pump EOP.

The electric oil pump EOP has a basic configuration in which a control unit 931, a motor unit 932, and a pump unit 933 are arranged in a straight line in the direction of an axis of rotation Z1 of the motor.

The electric oil pump EOP is provided such that the axis of rotation Z1 is orthogonal to the axis of rotation X of the power transmission device 1. In this state, the pump unit 933 is located at the very bottom of the housing chamber S3. An intake port 933a and a discharge port 933b of the pump unit 933 are located on the boundary toward the motor unit 932 and are each connected to an oil path inside the case.

The intake port 933a is connected to the strainer 10 via the oil path in the case and the oil path 626 inside the partition section 62 (see FIG. 3).

The strainer 10 is housed in the first chamber S1, separately from the housing chamber S3 of the control valve CV (see FIG. 3). In FIG. 5, as viewed from the front of the vehicle, the strainer 10 is arranged at the position indicated by the dashed lines, away from the viewer behind the housing chamber S3.

In the present embodiment, by positioning the pump unit 933 of the electric oil pump EOP at the very bottom of the housing chamber S3, the vertical line VL direction position of the intake port 933a of the pump unit 933 is brought closer to the strainer 10.

The length of the oil path connecting the strainer 10 and the intake port 933a of the electric oil pump EOP is thereby reduced.

The upper side of the control valve CV extends up to above the electric oil pump EOP. As viewed from the direction of the vertical line VL (the direction of the axis of rotation Z1 of the electric oil pump EOP), the electric oil pump EOP is provided in a positional relationship overlapping the control valve CV.

The control valve CV has connection ports 65, 66 for connecting with the oil paths (first oil path 635, second oil path 636) in the case.

The connection ports 65, 66 open in a location toward the second cover 8 (left side in the figure).

An oil cooler 20 is provided adjacent to the housing section 68 on the side of the case 6 in the lower part of the power transmission device 1.

The oil cooler 20 is attached to the side surface of the second cover 8 facing the front of the vehicle. An inlet 205 and an outlet 206 for the oil OL open on the surface of the oil cooler 20 facing the second cover 8.

A first connection path 835 connecting the oil inlet 205 of the oil cooler 20 with the first oil path 635, and a second connection path 836 connecting the oil outlet 206 of the oil cooler 20 with the first oil path 635 are provided inside the second cover 8.

The first connection path 835 and the second connection path 836 are provided in a location to join the boss sections 645, 646 on the case 6 side (see FIG. 3) when the second cover 8 is assembled onto the case 6.

Therefore, when the second cover 8 is assembled onto the case 6, the oil paths connecting the oil cooler 20 and the control valve CV (the first oil path 635 and the first connection path 835, and the second oil path 636 and the second connection path 836) are completed.

Further, the oil cooler 20 and the control valve CV are adjacent in the direction of the axis of rotation X of the power transmission device. In other words, the oil cooler 20 is positioned so that the lengths of the oil paths connecting the control valve CV and the oil cooler 20 (the first oil path 635 and the first connection path 835, and the second oil path 636 and the second connection path 836) are shortest.

The oil path resistance acting on the oil OL flowing through the oil paths can thus be reduced. This can be expected to reduce the load on the oil pumps (the electric oil pump EOP, the mechanical oil pump MOP).

The oil pressure control circuit 95 inside the control valve CV (see FIG. 6) regulates the operating oil pressure of the power transmission mechanism (such as the torque converter T/C) based on the oil pressure generated by the oil pumps.

The power transmission device 1 is equipped with one each of the mechanical oil pump MOP and the electric oil pump EOP as oil pumps. These oil pumps suction, pressurize, and supply the oil OL collected in the lower part of the housing HS to the oil pressure control circuit 95 (see FIG. 6) inside the control valve CV.

Figure 6:
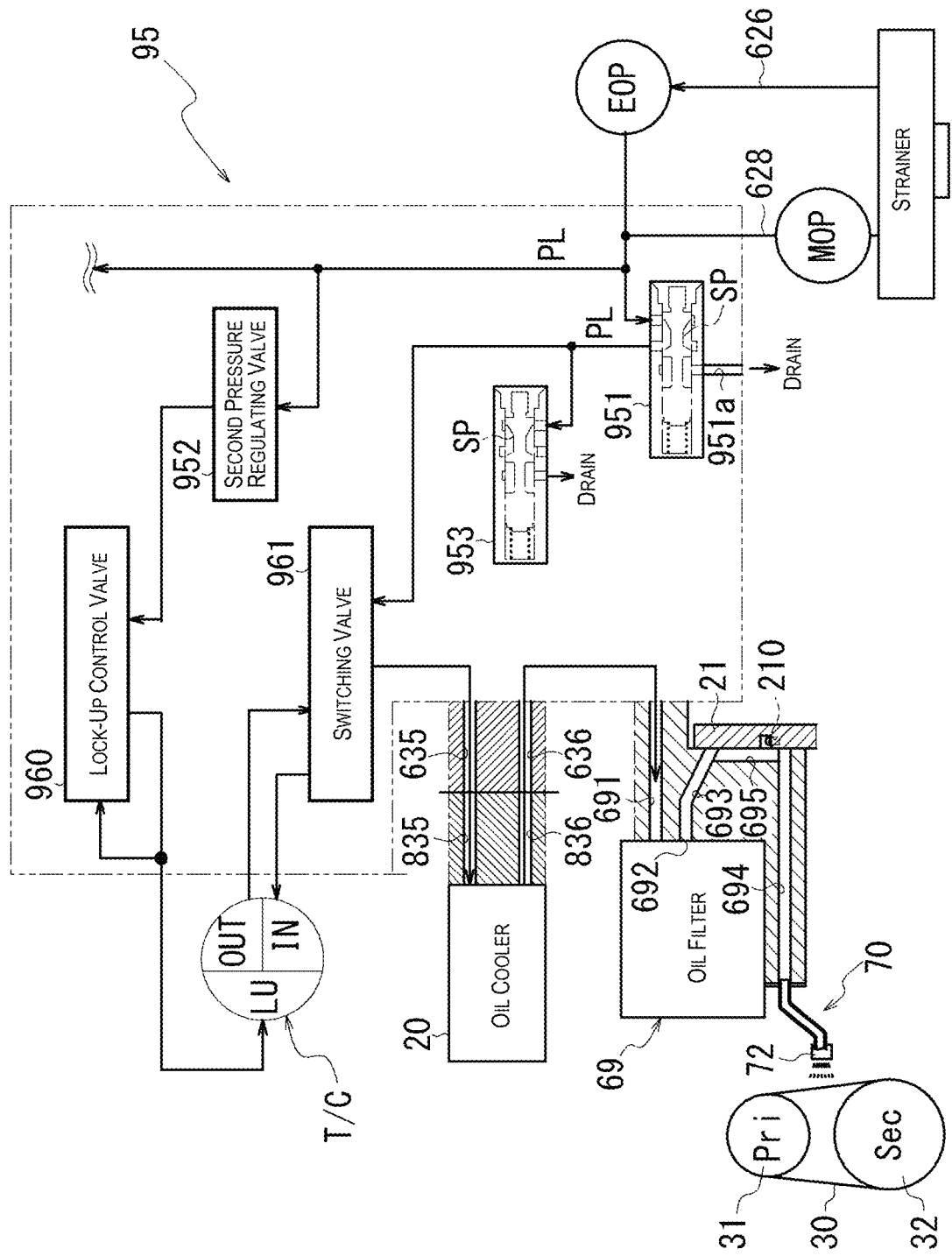
FIG. 6 is a diagram illustrating an example of an oil pressure control circuit within the control valve.

FIG. 6 is a diagram illustrating an example of the oil pressure control circuit 95 inside the control valve CV, showing parts related to regulation of the oil pressure supplied to the torque converter T/C within the oil pressure control circuit 95.

A first pressure regulating valve 951 adjusts the line pressure PL based on the oil pressure generated by the oil pump OP by regulating the drainage amount of oil OL in the first pressure regulating valve 951.

The line pressure PL adjusted by the first pressure regulating valve 951 is regulated by the second pressure regulating valve 952 and then supplied to a lock-up control valve 960.

The lock-up control valve 960 adjusts the lock-up control pressure according to commands from a control device, not shown, and supplies this to the torque converter T/C. Switching between engagement and release of the lock-up clutch is thereby performed Further, the line pressure PL adjusted by the first pressure regulating valve 951 is regulated by adjusting the drainage amount from the third pressure regulating valve 953 and then supplied to the switching valve 961.

The switching valve 961 switches between supplying the oil OL provided from the third pressure regulating valve 953 to the inlet port of the torque converter T/C, and supplying the oil OL returned from the outlet port to the oil cooler 20.

The oil OL flowing toward the oil cooler 20 from the switching valve 961 passes through the first oil path 635 on the case 6 side and the first connection path 835 on the second cover 8 side and is supplied to the oil cooler 20. The oil OL cooled by the oil cooler 20 is then returned to the oil pressure control circuit 95 in the control valve CV through the second connection path 836 and the second oil path 636.

The oil OL returned to the control valve CV is supplied to the parts of the power transmission device 1 that require lubrication, thereby lubricating the components of the power transmission device 1 (for example, the primary pulley 31, the secondary pulley 32).

As shown in FIG. 5, at the top of the control valve CV, an oil outlet 67 for lubricating oil OL is provided in a location facing the bottom wall section 682. This outlet 67 is located in the area on the side of case 6 facing the partition section 62, and the oil OL discharged from the outlet 67 is discharged into the oil path 691 within the case 6 (partition section 62) (see FIG. 7).

Figure 7:
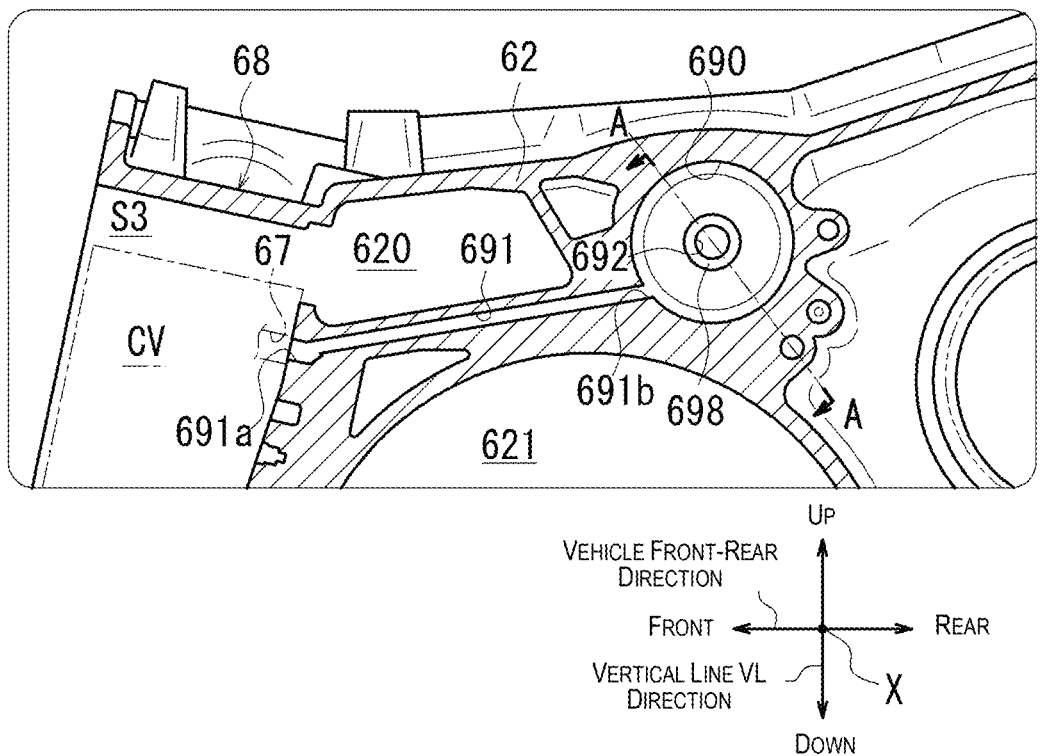
FIG. 7 is a cross-sectional diagram illustrating the oil paths provided in the partition section.

FIG. 7 is a schematic diagram showing a cross section of the case 6 along line A-A in FIG. 5.

Figure 8:
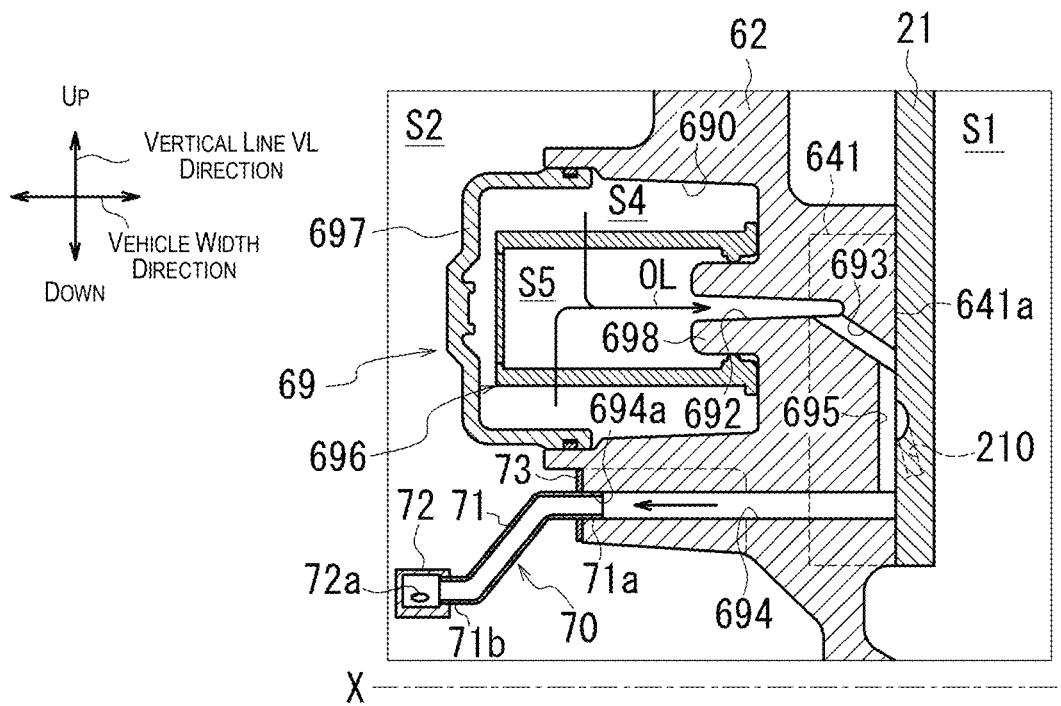
FIG. 8 is a cross-sectional diagram of the area around the oil filter in the partition section.

FIG. 8 is a schematic diagram showing a cross section around the oil filter 69 along line A-A in FIG. 7.

As shown in FIG. 7, in the partition section 62, an oil path 691 opens in the area of the control valve CV facing the discharge outlet 67.

The oil path 691 is provided in a recess 690 in the partition section 62 to supply oil OL.

As viewed from one end 691*a* of the oil path 691, the recess 690 is located on the upper side toward the rear of the vehicle.

Within the partition section 62, the oil path 691 extends linearly in a direction diagonally upwards toward the rear of the vehicle through the area between the through-hole 621 and the opening 620.

The recess 690 is provided using the thickness in the direction of the axis of rotation X of the partition section 62. The recess 690 is a closed-bottom hole that is open toward the second chamber S2 (toward the viewer).

The other end 691*b* of the oil path 691 opens at the inner circumference of the recess 690. As viewed from the opening direction of the recess 690, a cylindrical fitting part 698 is provided in the center of the recess 690.

As shown in FIG. 8, a filter member 696 is externally fitted and attached to a fitting part 698. The filter member 696 is made of a resin or metal material in the form of a closed-bottom cylinder with an opening diameter that allows the oil OL to pass. Therefore, the filter member 696 has an internal cylindrical space S5.

In this embodiment, the oil OL flowing from the oil path 691 into a space S4 inside the recess 690 flows from the outside of the filter member 696 into the internal space S5 inside the filter member 696. When this occurs, impurities contained in the oil OL are filtered out on the surface of the filter member 696, allowing the oil OL, from which impurities have been filtered, to flow into the internal space S5.

The closed-bottom cylindrical filter member 696 has a larger surface area and better shape stability than a filter simply placed midway through an oil path.

Therefore, the filter member 696 is less likely to become clogged compared to a filter simply placed midway in an oil path. Moreover, the flow resistance in the oil path where the filter is placed can be kept low.

In this embodiment, a concave hole (recess 690) is formed at a position in the path of the internal oil paths (oil path 691 and oil paths 692, 693) in the case 6 (partition section 62) that allows the closed-bottom cylindrical filter member 696 to be arranged along the path of the oil paths.

Thus, a concave hole is formed on the side surface of the case 6 (partition section 62), and the filter member 696 is provided within this formed concave hole.

This increases the surface area of the filter compared to simply filling the internal oil paths with a filter, making it less prone to clogging.

It is often difficult to ensure a large cross-sectional area for the oil paths due to layout constraints such as avoiding interference with other components. For this reason, the effective surface area of the filter tends to be reduced, creating susceptibility to clogging.

An oil path 692 is provided inside the fitting part 698. The oil path 692 is a closed-bottom hole that extends toward the first chamber S1 side (right side in the diagram) in the direction along the axis of rotation X. On the first chamber S1 side of oil path 692, an oil path 693 extending from the circumferential wall section 641 is connected.

As shown in FIG. 3, the circumferential wall section 641 is an annular wall that surrounds the outer circumference of the forward-reverse switching mechanism 2. On the end surface 641a of the circumferential wall section 641 toward the viewer, oil paths 693, 694 open. Additionally, on the end surface 641a of the circumferential wall section 641 toward the viewer, a connecting groove 695 extending from the oil path 693 to the oil path 694 is provided.

Note that it is also possible to omit the oil path 693, allowing the oil path 692 to open directly onto the end surface 641a of the circumferential wall section 641. In this case, the connecting groove 695 of the circumferential wall section 641 is provided to extend from the oil path 692 to the oil path 694.

As shown in FIG. 8, a dummy cover 21 is attached to the end surface 641a of the circumferential wall section 641 from the direction of the axis of rotation X.

The connecting groove 695 is closed by the dummy cover 21 fixed to the circumferential wall section 641, and the connecting groove 695 serves as a connecting path joining the oil paths 693 and 694 together.

Note that an oil path 210 within the dummy cover 21 opens opposite the connecting groove 695 in the dummy cover 21.

As noted above, the oil OL that has passed through the filter member 696 flows into the oil path 692. Therefore, the oil OL supplied from the oil path 692 is distributed between the oil path 694 and the oil path 210. The oil OL that flows into the oil path 210 is used for lubricating the friction engagement elements that constitute the forward-reverse switching mechanism 2.

The oil path 694 is oriented along the direction of the axis of rotation X of the power transmission device 1. One end 694a of the oil path 694 opens into the second chamber S2. The injection member 70 is attached to the one end 694a of the oil path 694. The injection member 70 has a cylindrical member 71, and one end 71a of the cylindrical member 71 is inserted into the one end 694a side of the oil path 694.

A mounting plate 73, which fixes the cylindrical member 71, is provided on the one end 71a side of the cylindrical member 71. The mounting plate 73 is fixed to the partition section 62 by screws, not shown, preventing the injection member 70 from detaching from the partition section 62.

The other end 71b of the cylindrical member 71 is provided with an injection part 72 that has an injection hole 72a.

The cylindrical member 71 is curved at multiple points in the longitudinal direction, positioning the injection part 72 in a location inserted into the belt 30 (see FIG. 4) wrapped around the primary pulley 31 and the secondary pulley 32.

Therefore, the oil OL distributed to the oil path 694 reaches the injection part 72 of the cylindrical member 71 and is then sprayed from the injection hole 72a of the injection part 72 toward the belt 30 wrapped around the primary pulley 31 and the secondary pulley 32. This cools and lubricates the primary pulley 31, the secondary pulley 32, and the belt 30 with the oil OL sprayed from the injection part 72.

Figure 9:
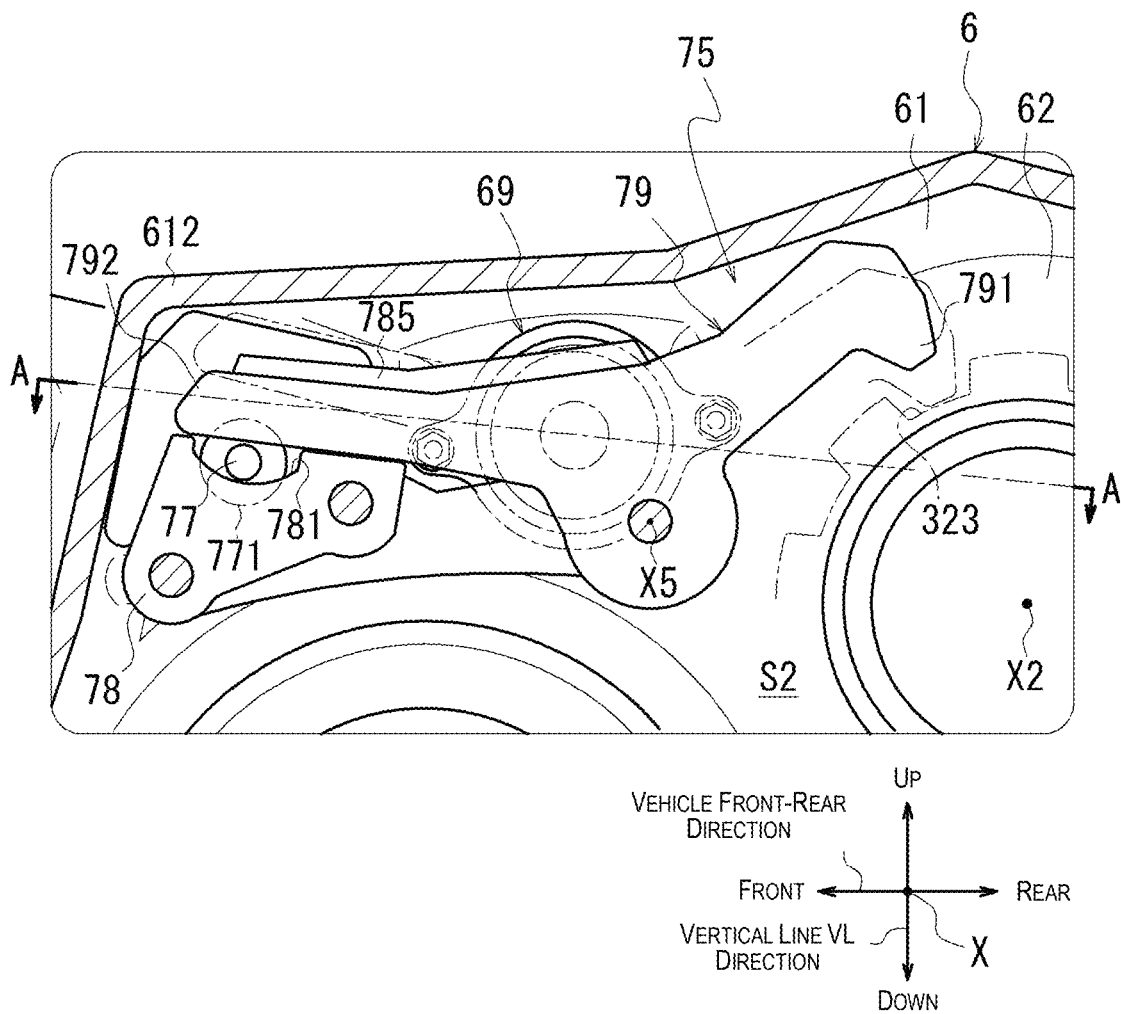
FIG. 9 is a schematic diagram showing the area around the parking pole arranged in the second chamber.

FIG. 9 is an enlarged view of the region in the case 6 where the oil filter 69 is located. In FIG. 9, a parking pole 79 of a park lock mechanism 75, a support actuator 78, and a parking rod 77 located on the front side of the oil filter 69 are shown superimposed.

Figure 10:
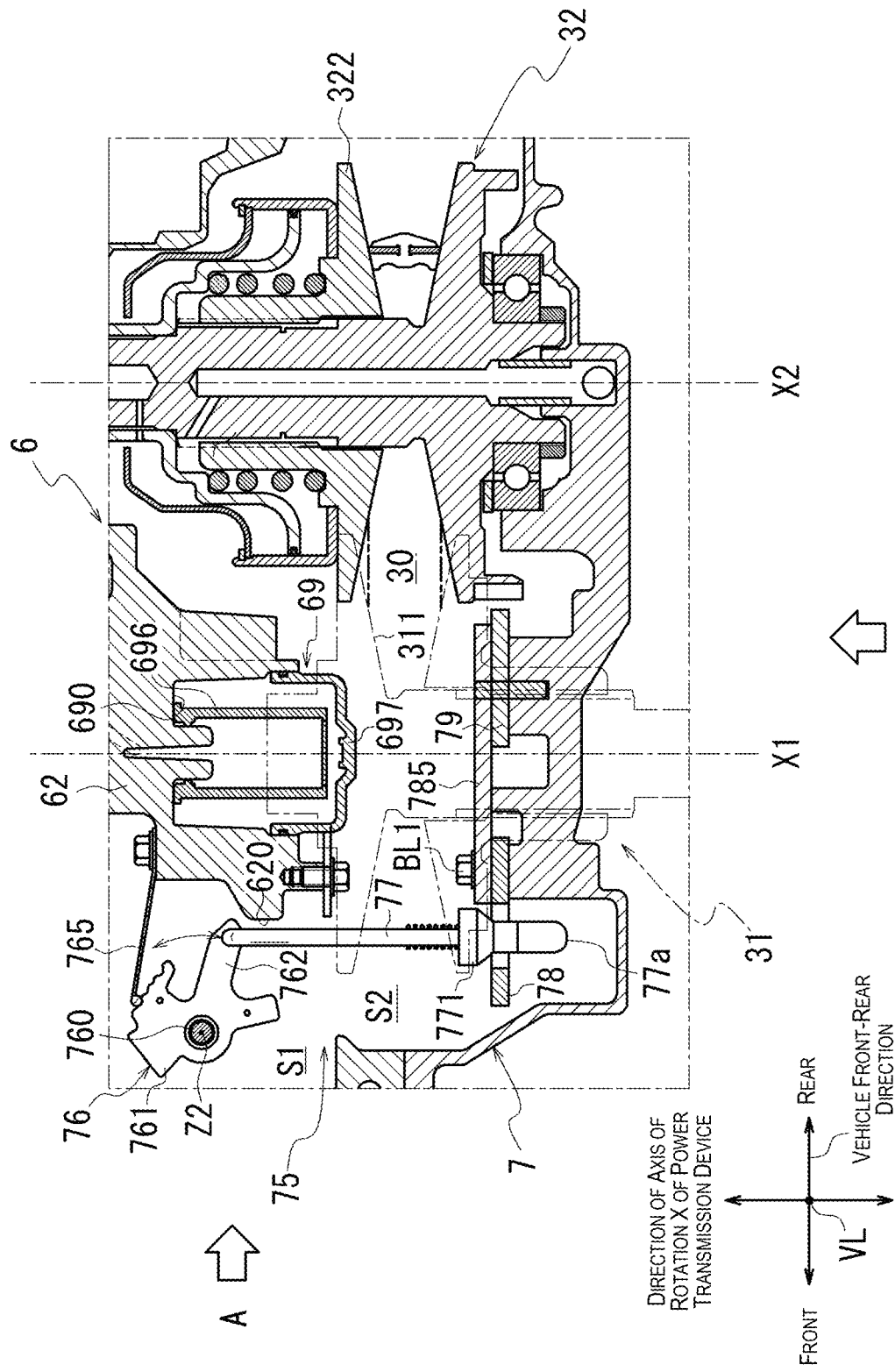
FIG. 10 is a diagram illustrating the arrangement of the oil filter in the second chamber.

FIG. 10 is a diagram showing a cross section along line A-A in FIG. 9.

As shown in FIG. 10, in the case 6, the opening 620 is used to provide the park lock mechanism 75.

The park lock mechanism 75 consists of a manual plate 76, the parking rod 77, the support actuator 78, and the parking pole 79.

In the case 6, the manual plate 76 is rotatably provided around an axis of rotation Z2 within the first chamber S1. The axis of rotation Z2 is a linear axis aligned with the vertical line VL. The manual plate 76 is connected to a manual shaft 760 extending in the direction of the vertical line VL. The manual plate 76 rotates about the axis of rotation Z2 in conjunction with rotation of the manual shaft 760.

In the manual plate 76, a detent spring 765 for positioning engages the outer circumference of the base 761. The manual plate 76 has a connecting piece 762. The connecting piece 762 extends radially outward from the outer circumference of the base 761 around the axis of rotation Z2. The top end of the parking rod 77 is rotatably connected to the distal end of the connecting piece 762.

The parking rod 77 passes from the first chamber S1 to the second chamber S2 through the opening 620 in the case 6. The tip 77a side of the parking rod 77 is placed on the support actuator 78, which is fixed to the first cover 7. The support actuator 78 is fastened to the first cover 7 by a bolt BL1 that passes through plate 785.

The connecting piece 762 to which the top end of the parking rod 77 is connected is displaced in the circumferential direction about the axis of rotation Z2 in conjunction with the rotation of the manual shaft 760. This displacement causes the parking rod 77 to advance and retract in the direction of the axis of rotation X of the power transmission device 1. This causes the parking rod 77 to become displaced between a position in which a cam 771 rides up onto the support actuator 78 and a position in which the cam 771 is separated from the support actuator 78.

As shown in FIG. 9, an operated part 792 of the parking pole 79 abuts the upper surface of the support actuator 78 due to the biasing force of a spring, not shown. When the cam 771 rides up on a cam surface 781 of the support actuator 78, the cam 771 is inserted between the cam surface 781 and the operated part 792. The parking pole 79 then rotates about a pivot axis X5, which is parallel to the axis of rotation X2. As a result, an engaging part 791 at the tip end of the parking pole 79 engages with a parking gear 323 provided on the secondary pulley 32, thereby restricting the rotation of the secondary pulley 32.

As shown in FIG. 10, there is extra space between the parking rod 77 and the secondary pulley 32 on the radial outer side (front side of the vehicle: left side in the diagram) of a movable pulley 322. In this embodiment, the space between the parking rod 77 and the movable pulley 322 is used to arrange the oil filter 69 (filter member 696).

Therefore, as viewed from the vertical line VL direction, the oil filter 69 is located within the space enclosed by the parking rod 77, the parking pole 79, and the movable pulley 322.

Thus, the oil filter 69 is disposed in a positional relationship overlapping the parking rod 77 and the movable pulley 322 of the secondary pulley 32, as viewed from the horizontal line direction, which is orthogonal to the axis of rotation X1 (direction of arrow A in the diagram). Further, as viewed from the horizontal line direction along the axis of rotation X1 (direction of arrow B in the diagram), the oil filter 69 is in a positional relationship overlapping the parking pole 79.

In FIG. 10, the fixed pulley 311 of the primary pulley 31 is located behind the oil filter 69 away from the viewer (below in the vertical line VL direction). Therefore, as viewed from the vertical line VL direction, the oil filter 69 is provided in an overlapping positional relationship with the fixed pulley 311 of the primary pulley 31.

As shown in FIG. 10, in this embodiment, the oil filter 69 is positioned further toward the first chamber S1 (toward the partition section 62) than the parking pole 79 in the direction of the axis of rotation X1. Further, in the direction of the axis of rotation X1, the oil filter 69 is positioned farther toward the first chamber S1 (toward partition section 62 side) than the belt 30 of the variator 3.

Thus, the oil filter 69 is provided effectively utilizing the space between the variator 3 (the belt 30) and the park lock mechanism 75 within the second chamber S2, avoiding interference with these components. This allows the oil filter 69 to be provided without significantly altering the shape of the housing HS (the second chamber S2). This prevents an increase in the size of the housing HS.

As described above, the power transmission device 1 for vehicles in this embodiment has the following configuration.

(1) The power transmission device 1 has a power transmission mechanism (torque converter T/C, forward-reverse switching mechanism 2, variator 3, reduction mechanism 4, differential device 5) that transmits driving force from the engine ENG (drive source) to the drive wheels WH, WH, a housing HS that accommodates the power transmission mechanism, a partition section 62 that is provided in the housing HS and that supports the power transmission mechanism, an oil path 691 (first the oil path) provided in the partition section 62, oil paths 692, 693 (second the oil path) provided in the partition section 62, a recess 690 that is provided in the partition section 62, and a filter member 696 positioned in the recess 690. The recess 690 is provided such that the opening faces the direction of the axis of rotation X of the power transmission device 1 (the power transmission mechanism). The oil paths 691 and 692 communicate through the recess 690.

With this configuration, by providing the recess 690 in the partition section 62 and the oil paths 691, 692, 693 in the partition section 62, the space inside the housing HS can be effectively utilized.

If the oil paths 691, 692, 693 were provided outside the partition section 62, it would be necessary to ensure the availability of space within the housing HS to provide the oil paths 691, 692, 693, potentially leading to an increase in the size of the housing HS. By providing the oil paths 691, 692, 693 within the partition section 62, the potential for increasing the size of the housing HS is reduced.

(2) In the direction of the axis of rotation X of the power transmission device 1, the recess 690 is provided using the thickness of the partition section 62. The recess 690 opens into the space on one side of the partition section 62 (second chamber S2).

With this configuration, the filter member 696 can be provided without significantly projecting from the partition section 62. This can reduce the extent to which the housing HS increases in size in the direction of the axis of rotation.

(3) As viewed from the direction of the axis of rotation X of the power transmission device 1, the recess 690 is positioned between the axis of rotation X1 of the primary pulley 31 (first rotating body) and the axis of rotation X2 of the secondary pulley 32 (second rotating body).

As viewed from the direction of the axis of rotation X of the power transmission device 1, there is a space above the line Lm (see FIG. 4) connecting the axis of rotation X1 and the axis of rotation X2, making it possible to avoid interference with the primary pulley 31 and the secondary pulley 32.

By forming the recess 690 in this space for providing the filter 69 and disposing the filter member 696 in the recess 690, the oil filter 69 can be positioned in the dead space between the axes of rotation X1 and X2 in the front-rear direction of the vehicle, avoiding interference with the primary pulley 31 and the secondary pulley 32. This effectively utilizes the dead space between the axis of rotation X1 and the axis of rotation X2.

Further, the oil filter 69 can be positioned between the axis of rotation X1 and the axis of rotation X2 closer to line Lm while avoiding interference with the belt 30 (see FIG. 4). This allows the oil filter 69 to be positioned without significantly projecting in the direction of line Ln, which is orthogonal to line Lm.

Thus, the extent to which the housing HS increases in size to accommodate the oil filter 69 is reduced.

(4) The first rotating body is the primary pulley 31 of the variator 3,
the second rotating body is the secondary pulley 32 of the variator 3, and
as viewed from the radial direction of the axis of rotation X of the power transmission device 1, the recess 690 overlaps the variator 3.

Specifically, as viewed from the direction of arrow A in FIG. 4, the oil filter 69 (the recess 690) overlaps the secondary pulley 32 of the variator 3 and is positioned within a range R32 overlapping in the vertical line VL direction.

As viewed from the direction of arrow C in FIG. 4, the oil filter 69 (the recess 690) overlaps the primary pulley 31 of the variator 3 and is positioned within a range R31 overlapping in the front-rear direction of the vehicle.

That is, as viewed from the radial direction of the axis of rotation X (vertical line VL direction, vehicle front-rear direction), the oil filter 69 (recess 690) overlaps the variator 3.

With this configuration, the recess 690 is positioned between the axis of rotation X1 and the axis of rotation X2 closer to the line Lm that connects the axis of rotation X1 and the axis of rotation X2. This allows the recess 690 for providing the oil filter 69 to be placed close to the variator 3, allowing the oil OL that has passed through the oil filter 69 to be supplied over a short distance and lubricate the variator 3.

Lubrication of the variator 3 (primary pulley 31, secondary pulley 32) requires the oil OL to be relatively clean and cool. The oil OL that has been cooled by the oil cooler 20 is supplied to the oil filter 69 via the control valve CV and the oil path 691.

The oil filter 69 can be disposed near the variator 3, allowing the oil OL that has passed through the oil filter 69 to be quickly supplied to the variator 3 to lubricate the variator 3.

(5) The control valve CV (control unit) that controls the oil pressure supplied to the power transmission mechanism is provided.

The control valve CV is provided oriented in the direction along the vertical line VL, based on the installation state of the power transmission device 1 in the vehicle V.

As viewed from the direction of the axis of rotation X of the power transmission device 1, the recess 690 is positioned between the control valve CV and the secondary pulley 32.

The term "oriented along the vertical line VL direction" in this specification is not limited to aspects in which the control valve CV is provided exactly vertical. It is sufficient that the control valve CV be provided at a predetermined angle relative to the vertical line VL. For example, it is acceptable for the range of the control valve CV in the vehicle front-rear direction (horizontal line direction) to be smaller than the range in the vertical line VL direction, and for the direction of advancement and retraction Xp (see FIG. 5) of the spool valves inside the control valve CV to be oriented in the horizontal line direction.

The control valve CV has a stacked structure with a separation plate 920 sandwiched between valve bodies 921, 921. Due to the thinness of the control valve CV in the stacking direction, when the control valve CV is oriented along the vertical line VL direction, the stacking direction of the control valve CV aligns with the horizontal line HL direction. This allows the discharge outlet 67, which supplies oil OL to the oil path 691, to open at a desired position in the vertical line VL direction. Thus, the discharge outlet 67 can be opened above where the oil filter 69 (recess 690) is located (see FIG. 7). That is, as viewed from the front of the vehicle, the discharge outlet 67 can be positioned closer to the oil filter 69 (recess 690), and more preferably overlapping with the oil filter 69 (recess 690).

This allows for a shorter length of the oil path 691 connecting the control valve CV (discharge outlet 67) and the recess 690. For example, if the discharge outlet 67 were to open at a position away from the oil filter 69 in the vertical line VL direction, the length of the oil path 691 would increase. This would result in higher flow resistance and increased load on the oil pumps (electric oil pump EOP and mechanical oil pump MOP), which would decrease the efficiency of the oil pumps. With this configuration, an improvement in the efficiency of the oil pumps can be expected.

(6) The park lock mechanism 75 (rotation restriction mechanism) that restricts the rotation of the secondary pulley 32 is provided.

The primary pulley 31 is positioned below the recess 690 in the vertical line VL direction.

On the control valve CV side of the recess 690, the parking rod 77, which is a component of the park lock mechanism 75, is provided oriented along the direction of the axis of rotation X of the power transmission device 1.

As viewed from the direction of the axis of rotation X of the power transmission device 1, the opening 620 through which the parking rod 77 is inserted is positioned between the recess 690 and the control valve CV (see FIG. 4).

As shown in FIG. 10, the parking rod 77 passes through the opening 620 in the direction of the axis of rotation X, and as viewed from the control valve CV side (the side indicated by arrow A in FIG. 10), the parking rod 77 is oriented along the axis of rotation X.

As viewed from the direction of the axis of rotation X of the power transmission device 1, the oil path 691 in the partition section 62 extends diagonally from the control valve CV to the recess 690 in a position below the opening 620 to avoid interference with the primary pulley 31 and the parking rod 77 (see FIGS. 7 and 10).

With this configuration, the connection distance between the control valve CV and the oil filter 69 (recess 690) can be shortened by passing through a position that avoid interference with the primary pulley 31 and the parking rod 77. This can minimize any increases in flow resistance, thereby reducing the load on the oil pumps (electric oil pump EOP and mechanical oil pump MOP). Improved efficiency of the oil pumps can be expected.

(7) As viewed from the direction of the axis of rotation X of the power transmission device 1, the parking pole 79 of the park lock mechanism 75 (another component) and the recess 690 provided in the partition section 62 are in an overlapping positional relationship (see FIG. 9).

As shown in FIG. 10, there is extra space between the parking pole 79 and the partition section 62. With this configuration, the oil filter 69 can be positioned using this extra space.

By housing the oil filter 69 within the existing extra space when the oil filter 69 is provided, the potential for an increase in size in the housing HS is reduced.

This also facilitates easier replacement of the filter member 696.

(8) In the direction of the axis of rotation X of the power transmission device, the filter member 696 is positioned between the parking pole 79 of the park lock mechanism 75 (another component) and the partition section 62 (see FIG. 10). In the direction of the axis of rotation X of the power transmission device, the partition section 62, the filter member 696, and the parking pole 79 are arranged in this order.

With this configuration, in the second chamber S2, the oil filter 69 (filter member 696) can be provided by effectively using the space between the parking pole 79 and the partition section 62, while avoiding interference with the park lock mechanism 75 (parking pole 79). This allows the oil filter 69 to be provided without significantly altering the shape of the housing HS (second chamber S2), thus preventing an increase in the size of the housing HS.

(9) In the direction of the axis of rotation X of the power transmission device 1, the filter member 696 is positioned between the partition section 62 and the belt 30 wrapped around the primary pulley 31 and the secondary pulley 32 (see FIG. 10).

In the direction of the axis of rotation X of the power transmission device, the partition section 62, the filter member 696, and the belt 30 are arranged in this order.

With this configuration, in the second chamber S2, the space between the variator 3 (belt 30) and the partition section 62 can be effectively utilized to provide the oil filter 69 while avoiding interference with the variator 3 (belt 30). This allows the oil filter 69 to be provided without significantly altering the shape of the housing HS (second chamber S2), thus preventing an increase in the size of the housing HS.

(10) The partition section 62 divides the space within the housing HS into the first chamber S1 and the second chamber S2, which are adjacent in the direction of the axis of rotation X of the power transmission device 1 (see FIG. 2).

As viewed from the direction of the axis of rotation X of the power transmission device 1, on the second chamber S2 side of the partition section 62, the oil path 694 (flow path) for oil OL for lubricating the primary pulley 31 and the secondary pulley 32 opens near the straight line Lm side of the recess 690 (see FIG. 4).

The oil path 693 (second the oil path) and the oil path 694 open and a connecting groove 695 that joins the oil paths 693 and 694 is formed on the first chamber S1 side of the partition section 62 (end surface 641a of the circumferential wall section 641) (see FIG. 3).

On the first chamber S1 side of the partition section 62 (end surface 641a of the circumferential wall section 641), the dummy cover 21 (cover member) is attached covering the openings of the oil paths 693, 694, and the opening of the connecting groove 695, forming a connecting path that connects the recess 690 and the oil path 694 (see FIG. 8).

With this configuration, there is no need to form the oil paths extending radially in the direction of the axis of rotation X within the partition section 62, which favorably prevents complicating the routing of the oil paths within the partition section 62.

Additionally, since the recess 690 and the oil path 694 can be connected over a short distance, the relatively cool oil OL that has just passed through the oil filter 69 can be supplied to the variator 3 (primary pulley 31 and secondary pulley 32). This allows for favorable lubrication and cooling of the variator 3 (primary pulley 31 and secondary pulley 32).

(11) Inside the dummy cover 21, an oil path 210 (branch path) is provided, opening opposite the connecting groove 695 (see FIG. 8).

The oil OL flowing into the oil path 210 is supplied to other elements of the power transmission device 1, excluding the variator 3 (primary pulley 31 and secondary pulley 32).

With this configuration, it is possible appropriately to lubricate the friction engagement elements of the forward-reverse switching mechanism 2 and other components.

Additionally, by distributing the oil OL that has passed through the oil filter 69 to various supply destinations, the housing HS can be prevented from increasing in size more effectively than if oil filters were provided in each oil path connected to the various supply destinations.

(12) The oil filter 69 has a cover 697 that seals the opening of the recess 690.

The recess 690 opens into the second chamber S2.

With this configuration, as shown in FIG. 10, on the second chamber S2 side of the partition section 62, there is a space surrounded by the park lock mechanism 75 (parking rod 77, parking pole 79), and the variator 3 (fixed pulley 311 of primary pulley 31, movable pulley 322 of secondary pulley 32, and belt 30). By providing the recess 690 opposite this space, the space within the second chamber S2 can be effectively utilized.

(13) The cover 697 is supported by the partition section 62.

With this configuration, simply attaching the cover 697 to the partition section 62 can seal the opening of the recess 690, which is provided using the thickness of the partition section 62.

If the oil filter 69 were provided separately from the partition section 62, there would be limitations regarding where the oil filter 69 could be installed within the housing HS, which could result in an increase in the size of the housing HS.

Since the oil filter 69 is integrated with the partition section 62 using the partition section 62, the extent to which the oil filter 69 affects the space within the housing HS can be reduced. This decreases the potential increase in size of the housing HS.

(14) In the direction of the axis of rotation X of the power transmission device 1, the cover 697 is positioned between the partition section 62 and the belt 30 of the variator 3.

In the direction of the axis of rotation X of the power transmission device, the partition section 62, the filter member 696, and the belt 30 are arranged in this order.

With this configuration, in the second chamber S2, the space between the variator 3 (belt 30) and the partition section 62 can be effectively utilized to provide the oil filter 69 while avoiding interference with the variator 3 (belt 30). This allows the oil filter 69 to be installed without significantly altering the shape of the housing HS (second chamber S2), thus preventing an increase in the size of the housing HS.

Figure 11:
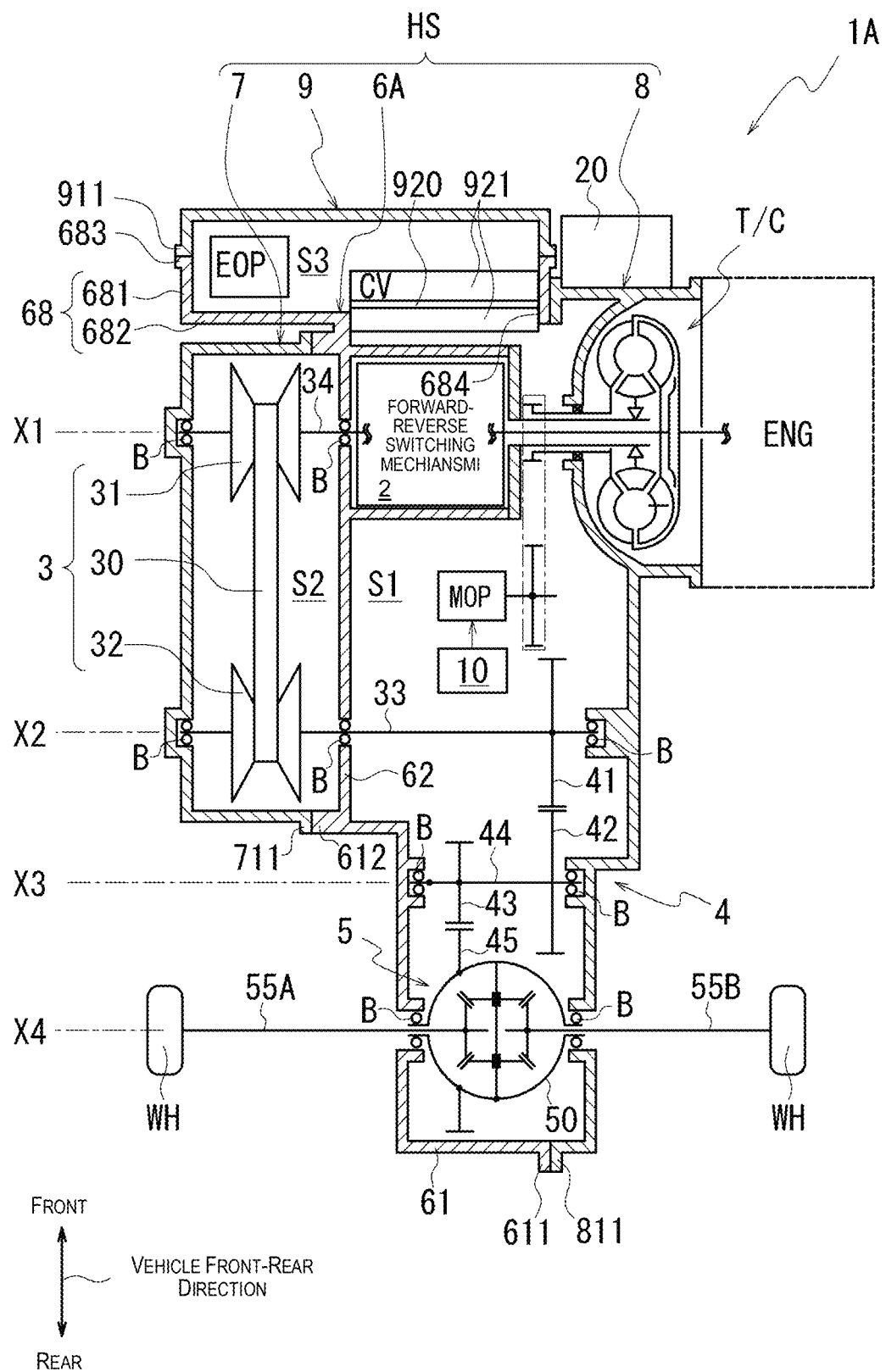
FIG. 11 is a schematic diagram showing a general configuration of a power transmission device according to a variant.

FIG. 11 is a schematic diagram illustrating the general configuration of a power transmission device according to a variant.

In the previously described embodiment, a case was described in which the first chamber S1 housing the strainer 10 and the housing chamber S3 housing the electric oil pump EOP and the control valve CV were completely separate. As shown in FIG. 11, a power transmission device 1A using a modified case 6A in which the first chamber S1 and the housing chamber S3 are interconnected through an opening 684 is also possible.

In this power transmission device 1A, the control valve CV is positioned to seal the opening 684, thereby partitioning the first chamber S1 and the housing chamber S3.

Even with this configuration of the power transmission device 1A, it is possible to prevent the power transmission unit 1 A from increasing in size while creating extra space within the housing HS, thus improving the layout in the housing HS.

In the foregoing embodiment, a case was illustrated in which the power transmission device 1 transmits rotation of the engine ENG to the drive wheels WH, WH, but it is also possible for the power transmission device 1 to transmit the rotation of at least either the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism can be arranged in the housing chamber S3 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited only to those aspects shown in the embodiments. The present invention may be appropriately modified within the scope of the technical concept of the invention.

DESCRIPTION OF REFERENCE SYMBOLS

1, 1A Power transmission device; 2 Forward-reverse switching mechanism (power transmission mechanism); 21 Dummy cover (cover member); 210 Oil path (branch path); 3 Variator (power transmission mechanism); 31 Primary pulley (first rotating body); 32 Secondary pulley (second rotating Body); 4 Reduction mechanism (power transmission mechanism); 5 Differential device (power transmission mechanism); ENG Engine (drive source); WH Drive wheels; HS Housing; T/C Torque converter (power transmission mechanism); 690 Recess; 691 Oil path (first oil path); 692 Oil path (second oil path); 693 Oil path (second oil path); 694 Oil path (flow path); 695 Connecting groove (connecting path); 696 Filter member; 75 Park lock mechanism (rotation restriction mechanism); 77 Parking rod (first component of rotation restriction mechanism); 79 Parking pole (second component of rotation restriction mechanism); CV Control valve (control unit); X Axis of rotation of the power transmission device; X1-X4 Axes of rotation; S1 First chamber (other side space); and S2 Second chamber (one side space).

The invention claimed is:

1. A power transmission device, comprising:
   a housing that accommodates a power transmission mechanism;
   a partition section that is provided in the housing and that supports the power transmission mechanism;
   a first oil path that is provided inside the partition section and into which oil collected in the housing is suctioned by a strainer and then supplied;
   a second oil path that is provided inside the partition section;
   a recess that is provided in the partition section; and
   a filter member that is disposed inside the recess, wherein
   the recess is provided with an opening facing a direction of an axis of rotation of the power transmission device, and
   the first oil path and the second oil path communicate via the recess.

2. The power transmission device according to claim 1, wherein
   in the direction of the axis of rotation of the power transmission device, the recess is defined by varying a thickness of the partition section.

3. The power transmission device according to claim 1, wherein
   as viewed from the direction of the axis of rotation of the power transmission device, the recess is disposed between an axis of rotation of a first rotating body and an axis of rotation of a second rotating body which constitute the power transmission mechanism.

4. The power transmission device according to claim 3, wherein
   the first rotating body is a primary pulley of a variator,
   the second rotating body is a secondary pulley of the variator, and
   as viewed from a radial direction of the axis of rotation of the power transmission device, the recess overlaps the variator.

5. The power transmission device according to claim 4, further comprising
   a control unit configured to control an oil pressure supplied to the power transmission mechanism, wherein
   the control unit is provided in a direction aligned in a vertical direction based on an installation state of the power transmission device in a vehicle, and
   in the direction of the axis of rotation of the power transmission device, the recess is disposed between the control unit and the secondary pulley.

6. The power transmission device according to claim 5, further comprising
   a rotation restriction mechanism configured to restrict rotation of the secondary pulley, wherein
   the primary pulley is positioned below the recess in the vertical direction, and
   on a control unit side of the recess, a first component of the rotation restriction mechanism is provided in a direction aligned in the direction of the axis of rotation of the power transmission device, and
   as viewed from the direction of the axis of rotation of the power transmission device, the first oil path extends diagonally from the control unit to the recess through a position that avoids interference with the primary pulley and the first component of the rotation restriction mechanism.

7. The power transmission device according to claim 6, wherein
   as viewed from the direction of the axis of rotation of the power transmission device, a second component of the rotation restriction mechanism and the recess are provided in an overlapping positional relationship.

8. The power transmission device according to claim 7, wherein
   in the direction of the axis of rotation of the power transmission mechanism, the filter member is positioned between the second component and the partition section.

9. The power transmission device according to claim 4, wherein
   in the direction of the axis of rotation of the power transmission device, the filter member is positioned between the partition section and a belt wrapped around the primary pulley and the secondary pulley.

10. The power transmission device according to claim 5, wherein
    the partition section divides a space inside the housing into a first chamber and a second chamber adjacent in the direction of the axis of rotation of the power transmission device,
    as viewed from the direction of the axis of rotation of the power transmission device, a flow path for oil for lubrication of the primary pulley and the secondary pulley opens near the recess on a second chamber side surface of the partition section,
    on a first chamber side surface of the partition section, the second oil path and the flow path open, and a communication groove connecting the second oil path and the flow path is formed, and
    a communication path linking the recess and the flow path is formed by a cover member attached to the first chamber side surface of the partition section and covering an opening of the second oil path, an opening of the flow path, and an opening of the communication groove.

11. The power transmission device according to claim 10, wherein
    a branch path opening a section opposite the communication groove is provided inside the cover member, and
    oil that flows into the branch path is supplied to elements of the power transmission mechanism except for the first rotating body and the second rotating body.

12. The power transmission device according to claim 10, further comprising
    a cover sealing the opening of the recess, wherein
    the recess opens into the second chamber.

13. The power transmission device according to claim 12, wherein
    the cover is supported by the partition section.

14. The power transmission device according to claim 12, wherein
    in the direction of the axis of rotation of the power transmission device, the cover is positioned between the partition section and a belt of the variator.

* * * * *